United States Patent
Morita et al.

(10) Patent No.: US 10,526,059 B2
(45) Date of Patent: Jan. 7, 2020

(54) SHIP VICINITY INFORMATION DISPLAY DEVICE AND METHOD OF DISPLAYING INFORMATION OF VICINITY OF SHIP

(71) Applicant: Furuno Electric Co., Ltd., Nishinomiya (JP)

(72) Inventors: Yu Morita, Fukuoka (JP); Yugo Kubota, Ashiya (JP); Hidetoshi Kaida, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 266 days.

(21) Appl. No.: 15/511,629

(22) PCT Filed: Aug. 4, 2015

(86) PCT No.: PCT/JP2015/072026
§ 371 (c)(1),
(2) Date: Mar. 15, 2017

(87) PCT Pub. No.: WO2016/042932
PCT Pub. Date: Mar. 24, 2016

(65) Prior Publication Data
US 2017/0253308 A1 Sep. 7, 2017

(30) Foreign Application Priority Data
Sep. 16, 2014 (JP) .................................. 2014-187827

(51) Int. Cl.
*B63B 49/00* (2006.01)
*G01C 21/20* (2006.01)
(Continued)

(52) U.S. Cl.
CPC .............. *B63B 49/00* (2013.01); *G01C 21/20* (2013.01); *G01C 21/203* (2013.01); *G01S 7/12* (2013.01);
(Continued)

(58) Field of Classification Search
CPC ...... B63B 49/00; G01C 21/20; G01C 21/203; G01C 21/22; G01C 21/34; G01C 21/343;
(Continued)

(56) References Cited

U.S. PATENT DOCUMENTS 4,205,313 A * 5/1980 Pease .................... G01S 7/22
342/182
4,706,090 A * 11/1987 Hashiguchi ......... G01S 13/9307
342/182
(Continued)

FOREIGN PATENT DOCUMENTS

CN   1541380 A   10/2004
CN   102830398 A   12/2012
(Continued)

OTHER PUBLICATIONS

"Automatic Identification System," entry in Wikipedia, accessed on Nov. 12, 2019. No author given. (Year: 2019).*
(Continued)

*Primary Examiner* — Bernarr E Gregory
(74) *Attorney, Agent, or Firm* — Alleman Hall Creasman & Tuttle LLP

(57) ABSTRACT

A ship vicinity information display device is provided, which is capable of displaying a position etc. of a destination of another ship based on information of the destination obtained from the other ship, in a mode which is intuitively easy to understand. A radar indicator may include a display unit, an AIS interface, and processing circuitry. The display unit may be capable of displaying an image of a situation in the vicinity of one ship. The AIS interface may receive the information of the destination of the other ship. The processing circuitry may acquire a longitude and latitude of the destination based on the destination information of the other ship and graphically display at least one of the position of the destination of the other ship and a direction of the destination from the other ship (other-ship destination symbol), on the display unit.

15 Claims, 8 Drawing Sheets

(51) Int. Cl.
  *G01S 13/93* (2006.01)
  *G08G 3/02* (2006.01)
  *G01S 7/12* (2006.01)
  *G01S 19/13* (2010.01)
  *G01S 7/24* (2006.01)
  *G01S 7/22* (2006.01)
  *B63J 99/00* (2009.01)
  *G06F 3/0481* (2013.01)
  *G01S 13/00* (2006.01)

(52) U.S. Cl.
  CPC .............. *G01S 7/22* (2013.01); *G01S 7/24* (2013.01); *G01S 13/93* (2013.01); *G01S 13/9307* (2013.01); *G01S 19/13* (2013.01); *G08G 3/02* (2013.01); *B63J 2099/008* (2013.01); *G06F 3/04812* (2013.01)

(58) Field of Classification Search
  CPC ... G01C 21/3446; G01C 21/3679; G06F 3/00; G06F 3/02; G06F 3/0213; G06F 3/03; G06F 3/033; G06F 3/048; G06F 3/0481; G06F 3/04812; G06F 3/0484; G01S 7/10; G01S 7/12; G01S 7/18; G01S 7/22; G01S 7/24; G01S 13/93; G01S 13/9307; G01S 19/13; G01S 19/14; G01S 19/15; G08G 3/00; G08G 3/02; B63J 2099/006; B63J 2099/008; G08B 21/12
  See application file for complete search history.

(56) References Cited

U.S. PATENT DOCUMENTS

| | | | | |
|---|---|---|---|---|
| 5,307,074 A * | 4/1994 | Janex | ............ | G08G 3/02 342/41 |
| 5,506,587 A * | 4/1996 | Lans | ............ | G01S 19/15 342/357.31 |
| 8,368,585 B2 * | 2/2013 | Kondo | ............ | B63B 49/00 342/41 |
| 8,779,920 B2 * | 7/2014 | Garnier | ............ | G08B 21/12 340/436 |
| 8,836,570 B2 * | 9/2014 | Ponsford | ............ | G01S 13/9307 340/984 |
| 2006/0161346 A1 * | 7/2006 | Murakami | ............ | G09B 29/102 708/442 |
| 2008/0079608 A1 * | 4/2008 | Morrell | ............ | G08G 3/00 340/984 |
| 2008/0133131 A1 * | 6/2008 | Poreda | ............ | G08G 3/02 701/418 |
| 2010/0033363 A1 * | 2/2010 | Lee | ............ | G08G 3/02 342/41 |
| 2010/0306700 A1 | 12/2010 | Willem | | |
| 2013/0271309 A1 * | 10/2013 | Kaida | ............ | G01S 7/10 342/41 |
| 2013/0286022 A1 | 10/2013 | Kubota et al. | | |
| 2014/0180566 A1 * | 6/2014 | Malhotra | ............ | G08G 3/02 701/300 |
| 2014/0210658 A1 * | 7/2014 | Ponsford | ............ | G08G 3/02 342/41 |
| 2015/0220568 A1 * | 8/2015 | Ueda | ............ | G01C 21/005 707/722 |

FOREIGN PATENT DOCUMENTS

| | | |
|---|---|---|
| CN | 103376422 A | 10/2013 |
| CN | 104221070 A | 12/2014 |
| EP | 2535732 B1 | 8/2018 |
| JP | H07304495 A | 11/1995 |
| JP | H10170643 A | 6/1998 |
| JP | H11326511 A | 11/1999 |
| JP | H11345397 A | 12/1999 |
| JP | 2001281331 A | 10/2001 |
| JP | 2001343892 A | 12/2001 |
| JP | 2005141656 A | 6/2005 |
| JP | 2007057499 A | 3/2007 |
| JP | 2012250649 A | 12/2012 |
| JP | 2014137750 A | 7/2014 |
| WO | 2004019301 A1 | 3/2004 |
| WO | 2004019302 A1 | 3/2004 |
| WO | WO2008/015467 A1 * | 2/2008 ............... G01S 7/24 |
| WO | 2008067151 A2 | 6/2008 |

OTHER PUBLICATIONS

European Patent Office, Extended European Search Report Issued in Application No. 15842695.7, dated May 18, 2018, Germany, 9 pages.

ISA Japan Patent Office, International Search Report Issued in Application No. PCT/JP2015/072026, dated Nov. 10, 2015, WIPO, 4 pages.

* cited by examiner

20a

| DESTINATION CODE | LONGITUDE AND LATITUDE OF DESTINATION |
|---|---|
| KWS | E 139°44'<br>N 35°31' |
| YOK | E 139°40'<br>N 35°24' |
| YOS | E 139°41'<br>N 35°16' |

| OTHER-SHIP NUMBER | LONGITUDE AND LATITUDE OF CURRENT POSITION | DESTINATION CODE | LONGITUDE AND LATITUDE OF DESTINATION |
|---|---|---|---|
| 1 | E 139°40'<br>N 35°24' | YOK | E 139°40'<br>N 35°24' |
| 2 | E 139°44'<br>N 35°31' | KWS | E 139°44'<br>N 35°31' |
| 3 | E 139°41'<br>N 35°16' | YOS | E 139°41'<br>N 35°16' |

FIG. 3

SHIP VICINITY INFORMATION DISPLAY DEVICE AND METHOD OF DISPLAYING INFORMATION OF VICINITY OF SHIP

TECHNICAL FIELD

This disclosure generally relates to a ship vicinity information display device, which is capable of displaying an image indicating a situation in the vicinity of a ship.

BACKGROUND ART

The AIS (Automatic Identification System) is structured to easily grasp ships in the vicinity and navigation conditions thereof.

Ships which satisfy a certain requirement are required to install a device which can transmit AIS information (AIS transceiver). This device wirelessly transmits, to the vicinity thereof, positional information, navigation information, etc. of one ship, at a given cycle according to a navigation state (mooring, movement etc.) of the one ship by using a frequency in the VHF band. This AIS information is received by ships in the vicinity or a land station, etc., thus, information of positions, speeds etc. of the one ship can be acquired.

Patent Document 1 discloses a display device connected to an AIS transponder (AIS transceiver), having a configuration for providing, among information of other ships obtained from the AIS, information of one of the other ships which is to be observed, in an easily understandable mode to a user. The display device of Patent Document 1 is configured to extract information of the other ship to be observed (e.g., consort ship) based on a comparison with registered information or matching with a specified area etc., and display an image based on the extracted information, in combination with graphics etc. on a display screen of a display unit in an easily understandable mode.

REFERENCE DOCUMENT OF CONVENTIONAL ART

Patent Document

Patent Document 1: JP2001-281331A

DESCRIPTION OF THE DISCLOSURE

Problems to be Solved by the Disclosure

Incidentally, AIS information contains destination information indicating to which destination a ship navigates. This is important information for a ship operator to determine the direction which the other ship will take, and for the one ship to navigate safely. For this reason, in Japan, since July 2010, in marine areas where the Act on Port Regulations and the Maritime Traffic Safety Act are applied, it is required to input the destination information to the AIS.

As a format of expressing destination information which is exchanged between ships by the AIS, a code determined according to the destination is often used. As this code, for example, a code determined by the United Nations (commonly known as UN/LOCODE) according to the destination port is used.

In this regard, the display device of Patent Document 1 has a function to display a code indicating the destination in a window. However, the code indicating the destination is determined as a short string of characters, for example, about three characters, therefore it is difficult for a user to understand the destination by simply reading the displayed code.

Note that, it is considered that by converting the destination information in the AIS from a code into a geographical name and displaying it, the destination becomes easier to understand to some extent. However, even by converting it into the geographical name, since it is still merely character information, there is a case where simply reading it is difficult to intuitively understand the destination. Especially when another ship sets the destination to a location with no sense of locality or an unfamiliar location, the destination needs to be searched from its geographical name, which is extremely inconvenient.

This disclosure is made in view of the above situations and aims to provide a ship vicinity information display device, which is capable of displaying a position etc. of a destination of another ship based on information of the destination obtained from the other ship in a mode which is intuitively easy to understand.

SUMMARY AND EFFECTS OF THE DISCLOSURE

The problems to be solved by the present disclosure is described as above, and measures to solve the problems and effects thereof will be described as follows.

According to a first aspect of the present disclosure, a ship vicinity information display device having the following configuration may be provided. That is, the ship vicinity information display device includes a display unit, a receiver and processing circuitry. The display unit displays a positional relationship between one ship and another ship. The receiver receives information of a destination of the other ship. The processing circuitry acquires a longitude and latitude of the destination based on the destination information of the other ship, and graphically displays at least one of a position of the destination of the other ship and a direction of the destination from the other ship, on the display unit.

Therefore, since the destination of the other ship is displayed on the display unit in a mode with which the positional relationship between the one and other ships is intuitively understandable, it may become easy for a user to estimate the scheduled course of the other ship specifically. Further, even if the destination of the other ship is a location with no sense of locality or an unfamiliar location in a foreign country, since a trouble for the user to search the position from the destination information is eliminated, the important information for safe navigation of the one ship may easily and accurately be obtained.

The ship vicinity information display device described above may have the following configuration. That is, the destination information of the other ship is information indicating a name of the destination. The processing circuitry acquires the longitude and latitude of the destination of the other ship by using information stored in a destination position memory configured to store the information indicating the name of the destination and positional information of the destination in association with each other.

Therefore, even if the name of the destination of the other ship is an unfamiliar geographical name, the user can easily grasp the destination.

The ship vicinity information display device described above may have the following configuration. That is, the destination information of the other ship is a destination code indicating a code of the destination. The destination position memory stores the destination code and the positional information of the destination in association with each other.

Therefore, even if the code indicating the destination of the other ship is difficult to understand, the user can easily grasp the destination.

In the ship vicinity information display device described above, the processing circuitry may display at least one of the destination of the other ship and the direction of the destination from the other ship, for a plurality of other ships simultaneously.

Therefore, the user can easily grasp the destinations of the respective other ships simultaneously. Thus, the one ship can suitably navigate even within a water area crowded with ships.

In the ship vicinity information display device described above, a target of which the information of the destination is displayed may be selectable from the plurality of other ships displayed on the display unit.

Therefore, since the information of the destination of the other ship which the user requests alone may be displayed on the display unit, the display unit may display in a manner which is simple and easy to view.

The ship vicinity information display device described above may have the following configuration. That is, the processing circuitry displays a geometric shape on the display unit. A position of the geometric shape displayed on the display unit indicates the position of the destination of the other ship.

Therefore, the user can intuitively understand the destination of the other ship based on the position of the geometric shape.

The ship vicinity information display device described above may have the following configuration. That is, the processing circuitry includes a course estimating module configured to create an estimated course that is a scheduled course of the other ship estimated based on the position of the destination of the other ship. The processing circuitry displays the estimated course created by the course estimating module on the display unit.

Therefore, it may become easy for the user to estimate the course of the other ship toward the destination.

In the ship vicinity information display device described above, the estimated course may be defined as a straight line coupling a current position of the other ship to the destination of the other ship.

Therefore, the estimated course may be created with simple processing.

The ship vicinity information display device described above may have the following configuration. That is, the course estimating module estimates a course from the current position of the other ship to the destination of the other ship by using course information stored in a course information memory configured to store the course information that is information of courses available for a ship.

Therefore, a more accurate course of the other ship may be created and displayed based on the course information stored in advance.

The ship vicinity information display device described above may have the following configuration. That is, the course information memory stores information of course and sizes of ships that are navigable on the courses, respectively. The course estimating module selects one of the courses that is available for the other ship based on a size of the other ship received from the other ship by the receiver, and estimates the course from the current position of the other ship to the destination of the other ship by using the selected course.

Therefore, an even more accurate course of the other ship may be created and displayed by taking into consideration the size of the other ship.

The ship vicinity information display device described above may have the following configuration. That is, the ship vicinity information display device includes a cursor interface configured to control a cursor displayed on the display unit so as to specify an arbitrary position on a display screen of the display unit. When the position of the other ship displayed on the display unit is specified by the cursor, for at least one of the specified other ship and a different other ship, a display mode of at least one of the destination and the direction of the destination from the other ship is changed.

Therefore, the information of the destination etc. may suitably be displayed according to the situation.

The ship vicinity information display device described above may have the following configuration. That is, the receiver receives AIS information transmitted by the other ship. The destination information is contained in the AIS information.

Therefore, the destination information contained in the AIS information may effectively be utilized.

According to a second aspect of the present disclosure, a method of displaying information of the vicinity of one ship as follows is provided. That is, the method of displaying information of the vicinity of the one ship includes a reception process and a display process. In the reception process, information of a destination of another ship is received. In the display process, a longitude and latitude of the destination based on the destination information of the other ship is acquired, and at least one of a position of the destination of the other ship and a direction of the destination from the other ship is graphically displayed on a display device configured to display a positional relationship between the one ship and the other ship.

Therefore, since the destination of the other ship is displayed on the display unit in a mode with which the positional relationship between the one and other ships is intuitively understandable, it may become easy for a user to estimate the scheduled course of the other ship specifically. Further, even if the destination of the other ship is a location with no sense of locality or an unfamiliar location in a foreign country, since a trouble for the user to search the position from the destination information is eliminated, the important information for safe navigation of the one ship may easily and accurately be obtained.

BRIEF DESCRIPTION OF DRAWINGS

FIG. 2 is a table illustrating an example of destination longitude-latitude information stored in a destination longitude-latitude information memory.

FIG. 3 is a table illustrating an example of an other-ship information table created by a table creating module.

MODES FOR CARRYING OUT THE DISCLOSURE

Figure 1:
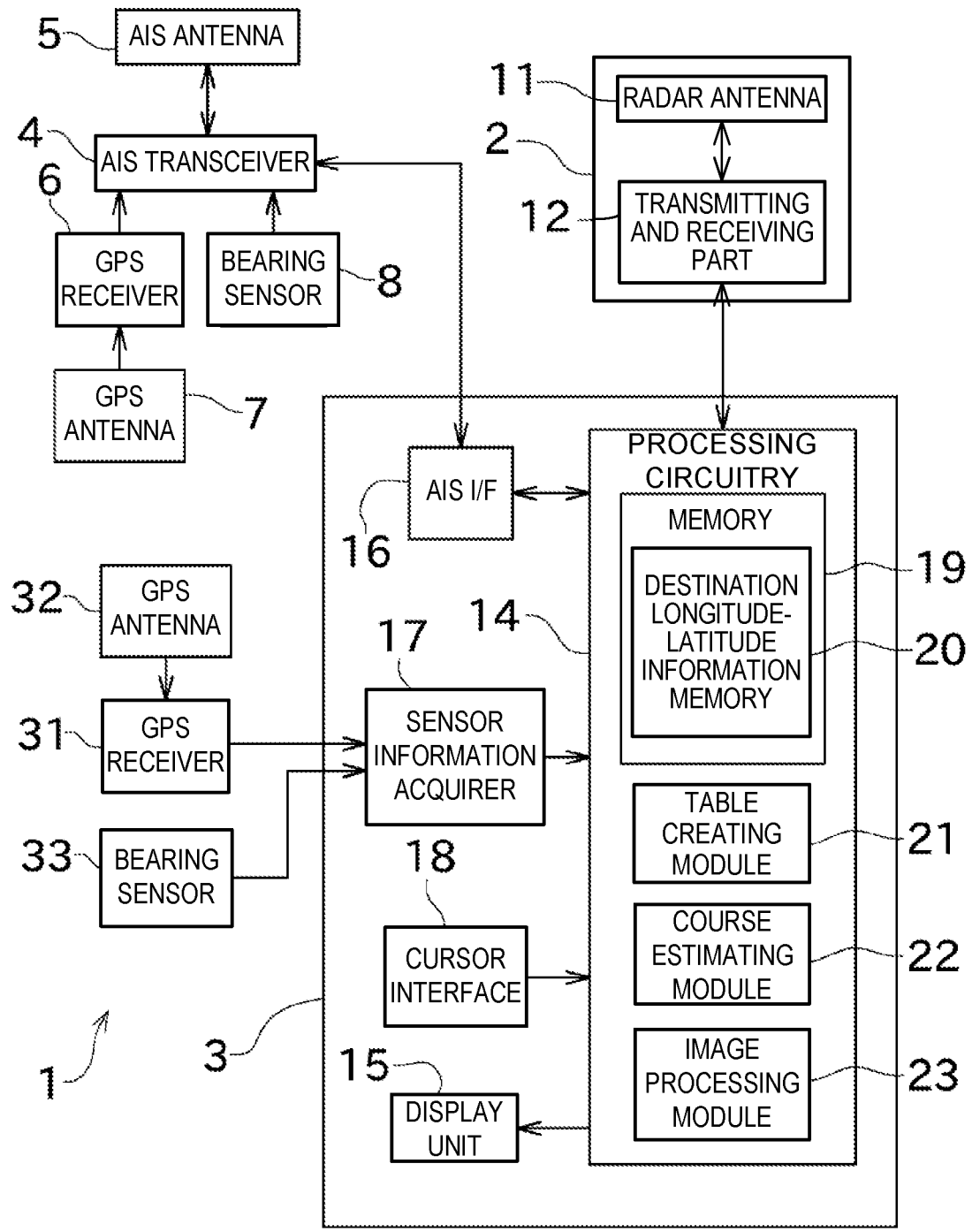
FIG. 1 is a functional block diagram illustrating an overall configuration of a radar apparatus including a radar indicator according to a first embodiment of this disclosure.

Next, embodiments of this disclosure is described with reference to the drawings. FIG. 1 is a functional block diagram illustrating an overall configuration of a radar apparatus 1 including a radar indicator 3 according to one embodiment of this disclosure.

The radar apparatus 1 of the first embodiment of this disclosure illustrated in FIG. 1 may include a radar antenna unit 2 and the radar indicator (ship vicinity information display device) 3. The radar indicator 3 may be connected with an AIS transceiver 4.

The radar antenna unit 2 may include a radar antenna 11 and a transmitting and receiving part 12. The radar antenna 11 may be capable of transmitting microwaves while rotating based on an instruction from the transmitting and receiving part 12, and receiving reflection wave(s) from target object(s). The transmitting and receiving part 12 may sample each signal received by the radar antenna 11 to digitalize it, and output the digitalized radar echo to the radar indicator 3.

The radar indicator 3 may include processing circuitry 14, a display unit 15, an AIS interface (receiver) 16, a sensor information acquirer 17, and a cursor interface 18.

Based on various data obtained from the radar antenna unit 2, the AIS transceiver 4, a GPS receiver 31, and a bearing sensor 33, the processing circuitry 14 may generate a particular image including a radar image which is an image indicating a vicinity situation of one ship, and output it to the display unit 15. Specific examples of the bearing sensor 33 include a gyrocompass. Further the processing circuitry 14 may be configured to control the radar antenna unit 2 and the AIS transceiver 4 as needed. Note that the specific configuration of the processing circuitry 14 is described later.

The AIS transceiver 4 may be connected with an AIS antenna 5 and configured to receive AIS signals transmitted from other ships. Each AIS signal received from the other ship may contain information, such as name, body length, width, current position, course over ground, ground speed, heading, rate of turn, navigation state, draft, load, destination, etc. of the other ship.

Note that, for the information of the destination, since only the alphanumeric characters may be transmitted due to the restriction of the AIS, it is expressed using a given code (e.g., the UN/LOCODE described above) to identify the destination. In the description below, the code indicating the destination may be referred to as "destination code." In this embodiment, the destination code is defined in principle with three alphabetical characters which is an abbreviation of a romanized geographical name, such as "KWS" for Kawasaki city in Kanagawa prefecture or "YOK" for Yokohama city in Kanagawa prefecture. However, for the sake of uniquely defining a great number of destinations by using a short string of three characters, a character which is not the pronunciation of the geographical name may be included, such as "KG3" (Komagane city in Nagano prefecture).

The AIS transceiver 4 may be connected with a GPS receiver 6 and a bearing sensor 8 to acquire data of a position and heading of the one ship which are to be transmitted to the vicinity of the one ship as AIS information. The GPS receiver 6 may be electrically connected with a GPS antenna 7. With this configuration, the AIS transceiver 4 may be configured to transmit, as an AIS signal, the information obtained from the GPS receiver 6 or the information obtained from the bearing sensor 8, etc. to the other ship at a given cycle. This AIS signal may contain similar information to the AIS signal which is received from the other ship.

The AIS information acquired by the AIS transceiver 4 from the other ship may be outputted to the processing circuitry 14 via the AIS interface 16 provided to the radar indicator 3. The AIS interface 16 may be configured as an external interface (e.g., connector) configured to take the AIS information from the AIS transceiver 4 into the radar indicator 3 and transmit the instruction from the radar indicator 3 to the AIS transceiver 4.

The GPS receiver 6 may be configured to receive GPS signals from GPS satellites and acquire information of the position (terrestrial reference absolute position) of the one ship. The GPS information acquired by the GPS receiver 6 may be outputted to the AIS transceiver 4.

The bearing sensor 8 may be configured to acquire the heading (terrestrial reference absolute angle) of the one ship. Specific examples of this bearing sensor 8 include a gyrocompass, similar to the bearing sensor 33. The information of the heading of the one ship acquired by the bearing sensor 8 may be outputted to the AIS transceiver 4.

The AIS transceiver 4 may create the AIS information based on the GPS information acquired by the GPS receiver 6, bearing information acquired by the bearing sensor 8, etc., and transmit the AIS information from the AIS antenna 5 to the vicinity as the AIS signal.

On the other hand, the AIS transceiver 4 may output the AIS signal of the other ship etc. received from the AIS antenna 5, to the processing circuitry 14 via the AIS interface 16.

The radar indicator 3 may include the sensor information acquirer 17. This sensor information acquirer 17 may be connected with the GPS receiver 31 and the bearing sensor 33. The GPS receiver 31 may be connected with a GPS antenna 32. The information acquired by these GPS receiver 31 and bearing sensor 33 (the terrestrial reference position and heading of the one ship) may be used as a reference of the position and bearing based on which the processing circuitry 14 creates the image to be displayed on the display unit 15.

Further the radar indicator 3 may include the cursor interface 18. For example, this cursor interface 18 is configured as a pointing device, an arrow key, etc. A user may, by controlling the cursor interface 18, move a cursor 25 described later displayed on a display screen of the display unit 15 (FIG. 4) and specify any position on the display screen.

As illustrated in FIG. 1, the processing circuitry 14 may include a memory 19, a table creating module 21, a course estimating module 22, and an image processing module 23.

Specifically, the processing circuitry 14 may be structured as a computer including a CPU, a ROM, a RAM, etc., and the memory 19 may be structured as a memory medium, such as the RAM, the ROM, an HDD, etc. built in the computer. Further the ROM provided to the processing circuitry 14 may store an AIS information display program to display the AIS information on the display unit 15. Thus, by the above-described hardware and software cooperating with each other, the processing circuitry 14 may be caused to operate as the table creating module 21, the course estimating module 22, and the image processing module 23.

The memory 19 may include a destination longitude-latitude information memory (destination position memory) 20. The destination longitude-latitude information memory 20 may store in advance destination longitude-latitude information 20a to cause the code of each destination (destination name) in the AIS information to correspond to the longitude and latitude of the destination. FIG. 2 illustrates an example of the destination longitude-latitude information 20a in a table format. In this destination longitude-latitude information 20a, a large number of destination codes with possibilities that a ship sets it as the destination may be associated with the longitudes and latitudes of the destinations indicated by the destination codes. The processing circuitry 14 may check the longitude and latitude of the destination based on the destination code, by referring to the stored contents of the destination longitude-latitude information memory 20.

The table creating module 21 may create an other-ship information table 21a which is a list of information of other ships located in the vicinity of the one ship (in other words, the other ships from which the AIS information is received). FIG. 3 illustrates an example of the created other-ship information table 21a. This other-ship information table 21a may contain other-ship numbers which are suitably assigned to identify the respective other ships, the longitudes and latitudes of the current positions of the respective other ships, and the destination codes of the respective other ships. Note that, the longitude and latitude of the current position and the destination code of each of the other ships may be obtained by analyzing the AIS information received from the other ship. Further the table creating module 21 may be configured to acquire the longitude and latitude corresponding to the destination code of the other ship by checking the stored contents (destination longitude-latitude information 20a) of the destination longitude-latitude information memory 20, and add the resulting longitude and latitude of the destination into the other-ship information table 21a.

The course estimating module 22 may acquire the other-ship information table 21a from the table creating module 21 and create estimated courses, i.e., scheduled courses, of the other ships, based on the information of the longitudes and latitudes of the current positions and the longitudes and latitudes of the destinations of the other ships.

The image processing module 23 may generate a radar image of the vicinity of the one ship based on the information obtained by the transmitting and receiving part 12 of the radar antenna unit 2, the AIS transceiver 4, the table creating module 21, and the course estimating module 22. Note that in this radar image, the one ship, the other ships, the destinations of the other ships, the estimated courses of the other ships, etc. may graphically be drawn.

Next, processing performed by the processing circuitry 14 to acquire the AIS information and cause the display unit 15 to display the image is described in detail.

Once the processing circuitry 14 receives the AIS information from the other ships, it may assign other-ship numbers so as to be able to identify the respective other ships uniquely. Further the processing circuitry 14 may acquire the longitude and latitude of the current position and the destination code of each of the other ships by analyzing the AIS information of the ship. Moreover the table creating module 21 may create and store the other-ship information table 21a containing the other-ship number, the longitude and latitude of the current position, the destination code, and the longitude and latitude of the destination of each of the other ships. Note that the longitude and latitude of the destination may be obtained by searching the destination code in the destination longitude-latitude information 20a stored in the destination longitude-latitude information memory 20.

For each of the ships described on the other-ship information table 21a created by the table creating module 21, the course estimating module 22 may calculate the estimated course based on the longitude and latitude of the current position and the longitude and latitude of the destination, and output it.

The image processing module 23 may generate the radar image based on the radar echoes obtained from the transmitting and receiving part 12 of the radar antenna unit 2. Note that in this embodiment, the radar image may be generated so that the one ship is located at the center of the radar image with the heading of the one ship oriented upward (i.e., heading up), or the north may be on the upper side (north up). Further, based on the other-ship information table 21a created by the table creating module 21, the image processing module 23 may draw a symbol indicating the other ship by superimposing it on the radar image described above. Moreover, based on the information received from the table creating module 21 and the course estimating module 22, the image processing module 23 may draw a symbol indicating the destination of the other ship and a line indicating the scheduled estimated course of the other ship by superimposing them on the radar image, and cause the display unit 15 to display them. Note that, the contents displayed on the display unit 15 are described later in detail.

The display unit 15 may be configured as a liquid crystal display capable of color display, for example. This display unit 15 may display the radar image generated by the image processing module 23.

Figure 4:
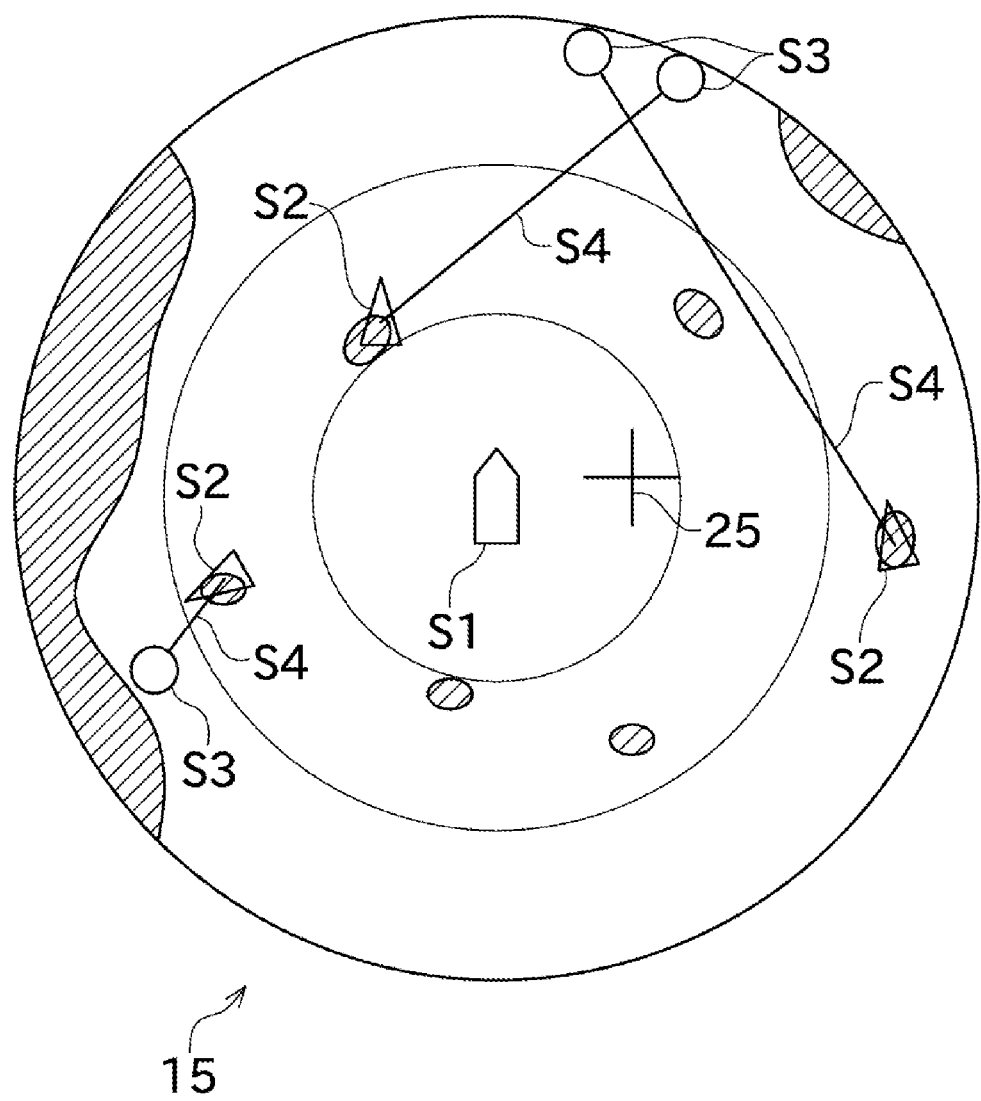
FIG. 4 is a table illustrating an example of a display screen of a display unit.

FIG. 4 illustrates an example of the radar image displayed on the display unit 15. As illustrated in FIG. 4, on the display screen of the display unit 15, the radar echoes may be displayed and also a one-ship symbol S1, other-ship symbols S2, other-ship destination symbols S3, and estimated courses S4 may all be displayed graphically (as geographical shapes, to be specific).

The one-ship symbol S1 may be displayed at the center of the radar image and indicate the current position of the one ship. Note that in the example of FIG. 4, the radar image may be generated such that the traveling direction of the one ship is fixed to an upward direction of the display screen (heading up). Each other-ship symbol S2 may indicate the current position of the other ship and be displayed as an isosceles triangle. The direction indicated by the vertex angle of the isosceles triangle may indicate the heading of the other ship. Further each other-ship destination symbol S3 may indicate the destination of the other ship and be displayed as a circle. Each estimated course S4 may indicate the scheduled course of the other ship estimated by the course estimating module 22, and be displayed as a solid line.

In this embodiment, the course estimating module 22 may output, as the estimated course, a single straight line formed by simply coupling the current position of the other ship to the destination of the other ship. Therefore, the direction of the straight line of the estimated course S4 displayed on the display unit 15 may indicate the direction of the destination from the other ship. In this manner, the configuration of the course estimating module 22 may become simple and also the processing time required for the course calculation may be shortened.

Note that when the other ship sets a distant location as the destination, a case may be considered where the position at which the other-ship destination symbol S3 is to be displayed is outside the screen range of the radar image. In this case, the other-ship destination symbol S3 may be displayed at a position of the estimated course S4 slightly before reaching outside the screen range (the end part of the radar image).

By the display unit 15 displaying as FIG. 4, the user can intuitively and easily understand the position of the destination of the other ship based on the displayed position of the other-ship destination symbol S3, without the trouble of searching it from the destination code. Moreover the assumption of the scheduled course of the other ship by the user becomes much easier by displaying the estimated course S4. Therefore, by displaying as FIG. 4, the user can, for example, predict that the other ship navigating on the left side with respect to the traveling direction of the one ship will turn rightward based on the positional relationship between the other-ship destination symbol S3 and the other-ship symbol S2 (further the estimated course S4), and suitably steer the one ship, e.g., decelerate it in advance. By displaying the information of the destination contained in the AIS information on the display unit 15 in a mode which is intuitively easy to understand as above, the information in navigation of the one ship may effectively be utilized.

Moreover in this embodiment, as illustrated in FIG. 4, the other-ship destination symbol S3 and the estimated course S4 may be displayed for the plurality of other ships (other-ship symbols S2) displayed in the vicinity of the one ship, simultaneously. Therefore, the user can easily grasp the destinations of the plurality of other ships simultaneously, thus, the one ship can suitably navigate even within a water area crowded with ships.

Additionally, in order to achieve such a display mode as described above, the destination longitude-latitude information memory 20 provided to the radar indicator 3 may store the destination longitude-latitude information 20a in which the destination code is associated with the longitude and latitude of the destination. Therefore, by searching the destination code from the destination longitude-latitude information 20a, the position of the destination may easily be obtained.

The display unit 15 may be configured to be capable of displaying the cursor 25 by superimposing it on the radar image described above. The cursor 25 may be configured to allow the user to specify any location on the display screen. This cursor 25 may be moved freely by the user controlling the cursor interface 18.

Further the display unit 15 may be configured to display detailed information of the other ship when the user performs an operation of specifying one of the other-ship symbols S2 by using the cursor 25 described above (the operation of superimposing the cursor 25 on the other-ship symbol S2, to be specific). Hereinafter, two examples in which the display screen changes according to the position of the cursor 25 are described with reference to FIGS. 4 to 6.

Figure 5:
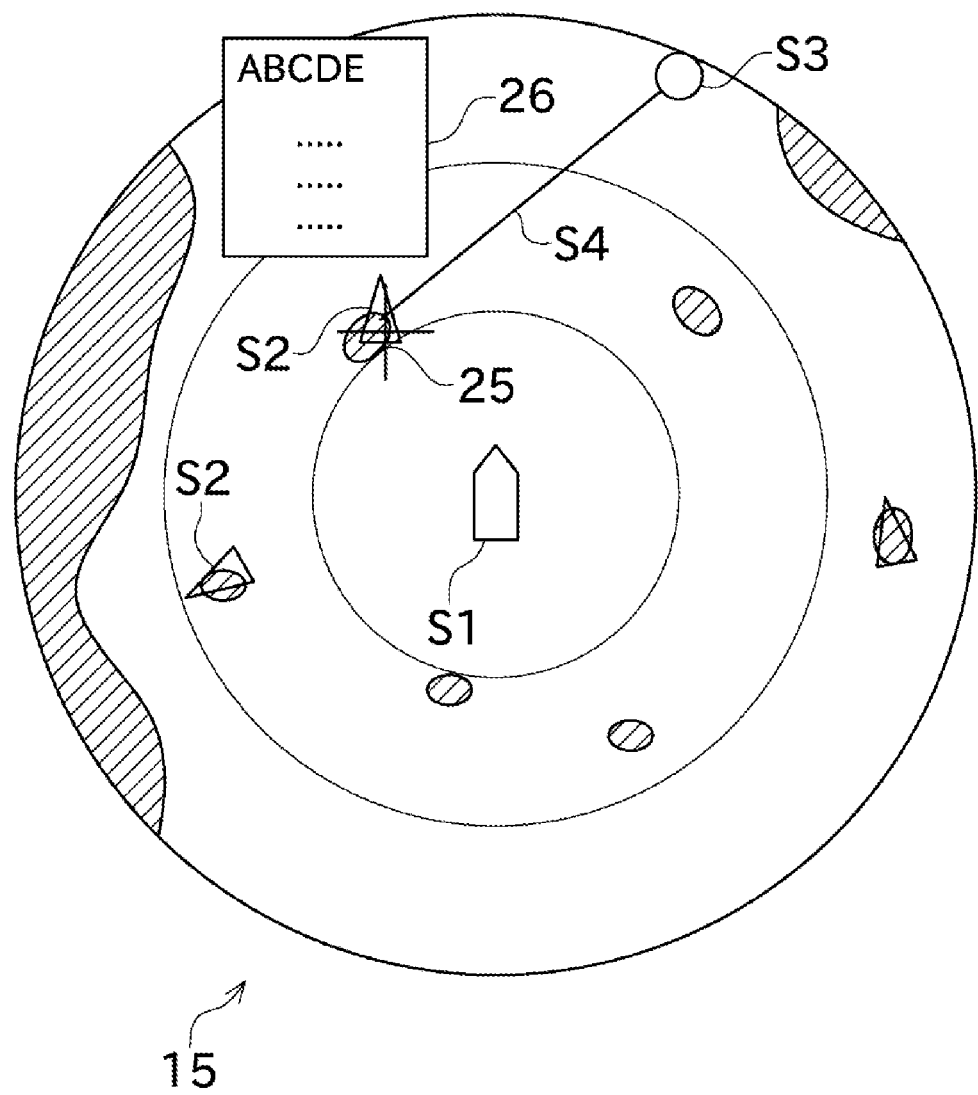
FIG. 5 is a view illustrating a change of the display screen when a cursor is superimposed on an other-ship symbol from the state of FIG. 4.

In the first example, normally, the other-ship destination symbols S3 and the estimated courses S4 for all the other-ship symbols S2 are displayed as illustrated in FIG. 4. Further, when the cursor 25 at the position illustrated in FIG. 4 is moved to be superimposed on a certain other-ship symbol S2, as illustrated in FIG. 5, only the other-ship destination symbol S3 and the estimated course S4 of the other ship concerned may be displayed, and the other-ship destination symbols S3 and the estimated courses S4 of the other ships different from the other ship concerned may become not displayed. Thus, the destinations of the plurality of other ships may simultaneously be monitored at normal times, and if the user requests, the other-ship destination symbols S3 and the estimated courses S4 which are displayed may be narrowed to those of the other ship to be observed alone, so that the display unit 15 becomes easier to view.

Note that the display unit 15 of this embodiment may be configured to display, when the cursor 25 is placed on the other-ship symbol S2, the name of the other ship in a popup window 26 at a position close to the other-ship symbol S2 (cursor 25). This name of the ship ("ABCDE" in the example of FIG. 5) may be acquired based on the AIS information acquired from the other ship. Note that the information displayed in the popup is not limited to the ship name, and one or more of the various information contained in the AIS information, such as information of body length, width, current position, course over ground, ground speed, heading, rate of turn, navigation state, draft and load may selectively be displayed. Thus, the user can obtain more detailed information about the other ship.

Figure 6:
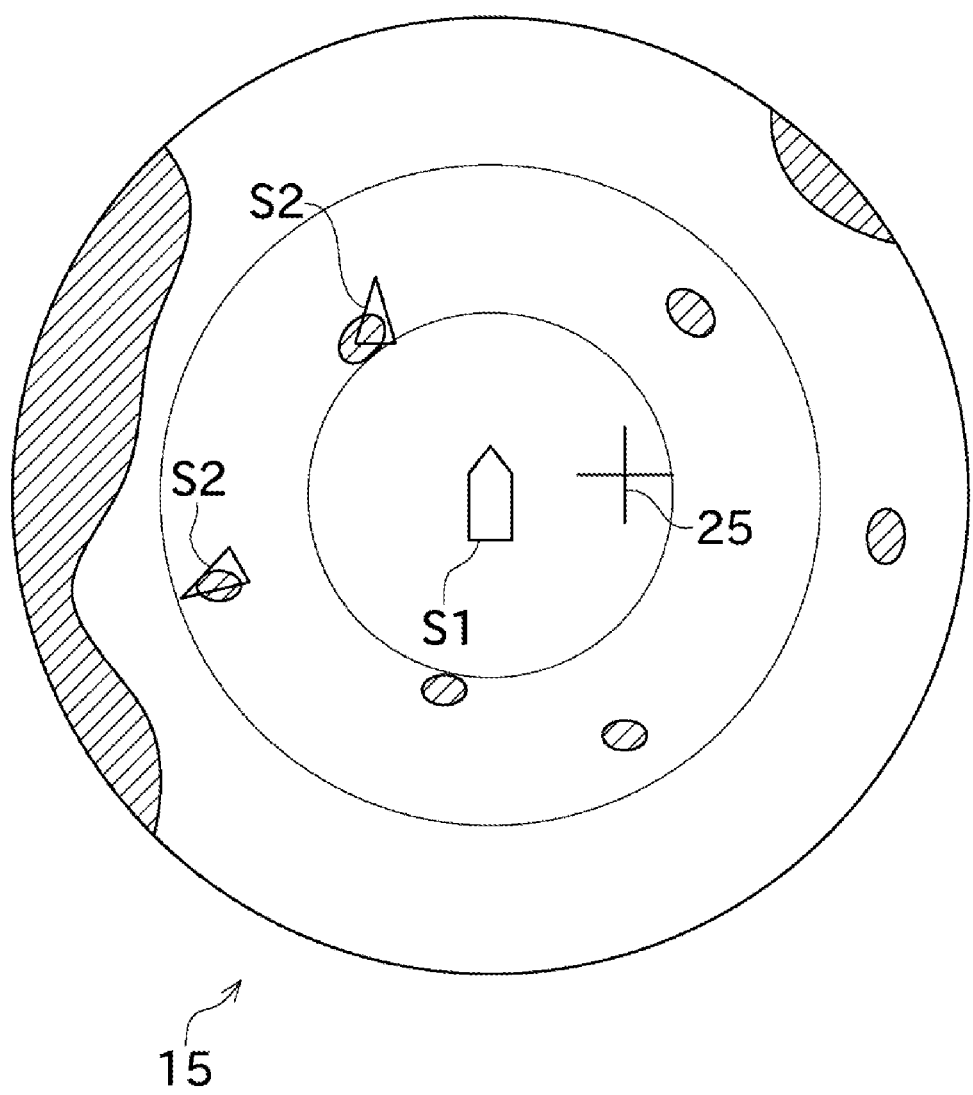
FIG. 6 is a view illustrating another example of the display screen of the display unit.

In the second example, normally, as illustrated in FIG. 6, the other-ship destination symbols S3 and the estimated courses S4 for all the other-ship symbols S2 are not displayed. Further, when the cursor 25 at the position illustrated in FIG. 6 is moved to be superimposed on a certain other-ship symbol S2, as illustrated in FIG. 5, the other-ship destination symbol S3 and the estimated course S4 of (only) the other ship concerned may be displayed. In this example, it may be avoid that the plurality of other-ship destination symbols S3 and the plurality of estimated courses S4 are displayed on the display unit 15 at normal time, and the display screen becomes crowded and complex.

In this embodiment, by the operation of superimposing the cursor 25 on the other-ship symbol S2 (in other words, the operation of selecting a target other ship of which information of the destination is desired to be displayed), the display mode of the other-ship destination symbol S3 and the estimated course S4 which relate to the target other ship on which the cursor 25 is superimposed, or the display mode of the other-ship destination symbols S3 and the estimated courses S4 relating to the other ship different from the target other ship is changed. Therefore, the information of the destination etc. may suitably be displayed according to the situation.

As described above, the radar indicator 3 of this embodiment may include the display unit 15, the AIS interface 16, and the processing circuitry 14. The display unit 15 may display the positional relationship of the one and other ships. The AIS interface 16 may receive the destination information of the other ship. The processing circuitry 14 may acquire the longitude and latitude of the destination based on the destination information of the other ship, and graphically display the position of the destination of the other ship and the direction of the destination from the other ship (the other-ship destination symbol S3 and the estimated course S4), on the display unit 15.

Therefore, since the destination of the other ship in the AIS is displayed on the display unit 15 in a mode with which the positional relationship between the one and other ships is intuitively understandable, it may become easy to estimate the scheduled course of the other ship specifically. Further, even if the destination of the other ship is a location with no sense of locality or an unfamiliar location in a foreign country, since the trouble for the user to search the position from the destination information (code) is eliminated, the important information for safe navigation may easily and accurately be obtained.

Figure 7:
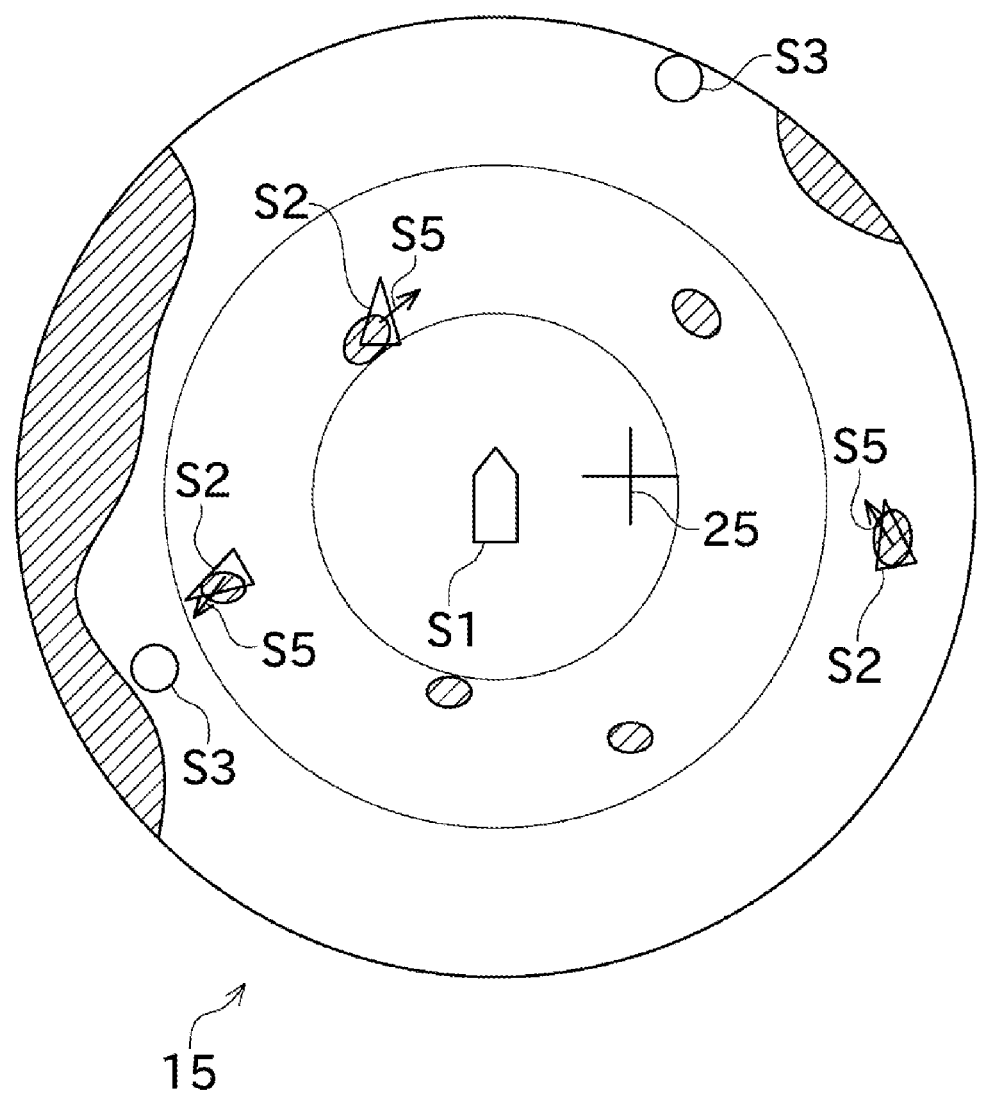
FIG. 7 is a view illustrating a modification in which the direction of the destination is indicated by an arrow.

Next, a first modification of the first embodiment is described. FIG. 7 is a view of an example of a display screen of a display unit 15 according to the modification of the first embodiment. Note that, in the description of this modification, the components same as/similar to the ones in the embodiment described above are denoted with the same reference characters as those in the embodiment described above in the drawings, and the description thereof may be omitted.

In this modification, as illustrated in FIG. 7, the display unit 15 may display a one-ship symbol S1, other-ship symbols S2, other-ship destination symbols S3, and destination direction arrows S5. Each destination direction arrow S5 may indicate the direction of a destination seen from the other ship. The destination direction arrow S5 may be displayed by having the other-ship symbol S2 as its origin, and a tip of the arrow may be oriented to the direction of the destination of the other ship (other-ship destination symbol S3).

That is, in the first embodiment described above (FIG. 4), the scheduled estimated course S4 may be displayed as a straight line connecting the other-ship symbol S2 to the other-ship destination symbol S3. With this configuration, since the other-ship symbol S2 may be coupled to the other-ship destination symbol S3 by a straight line even when there are a plurality of ships in the vicinity of the one ship, there is a merit that the corresponding relationship is not easily mistaken. However in the first embodiment, if there are a large number of ships in the vicinity, the number of straight lines drawn for the estimated course S4 may be displayed superimposed on the other-ship symbols S2 and the other-ship destination symbols S3, causing a possibility that the display screen becomes complex and difficult to view.

For this reason, as illustrated in FIG. 7, the display unit 15 of this modification may be configured to display, instead of the estimated course S4, the destination direction arrow S5 at the position of the other-ship symbol S2 by superimposing it thereon. The destination direction arrow S5 may be expressed with a smaller geometric shape compared to that of the estimated course S4. Therefore the destination direction arrow S5 may be less likely to be displayed superimposed on the other-ship symbols S2 and the other-ship destination symbols S3, and the display screen of the display unit 15 may be prevented from becoming complex.

Figure 8:
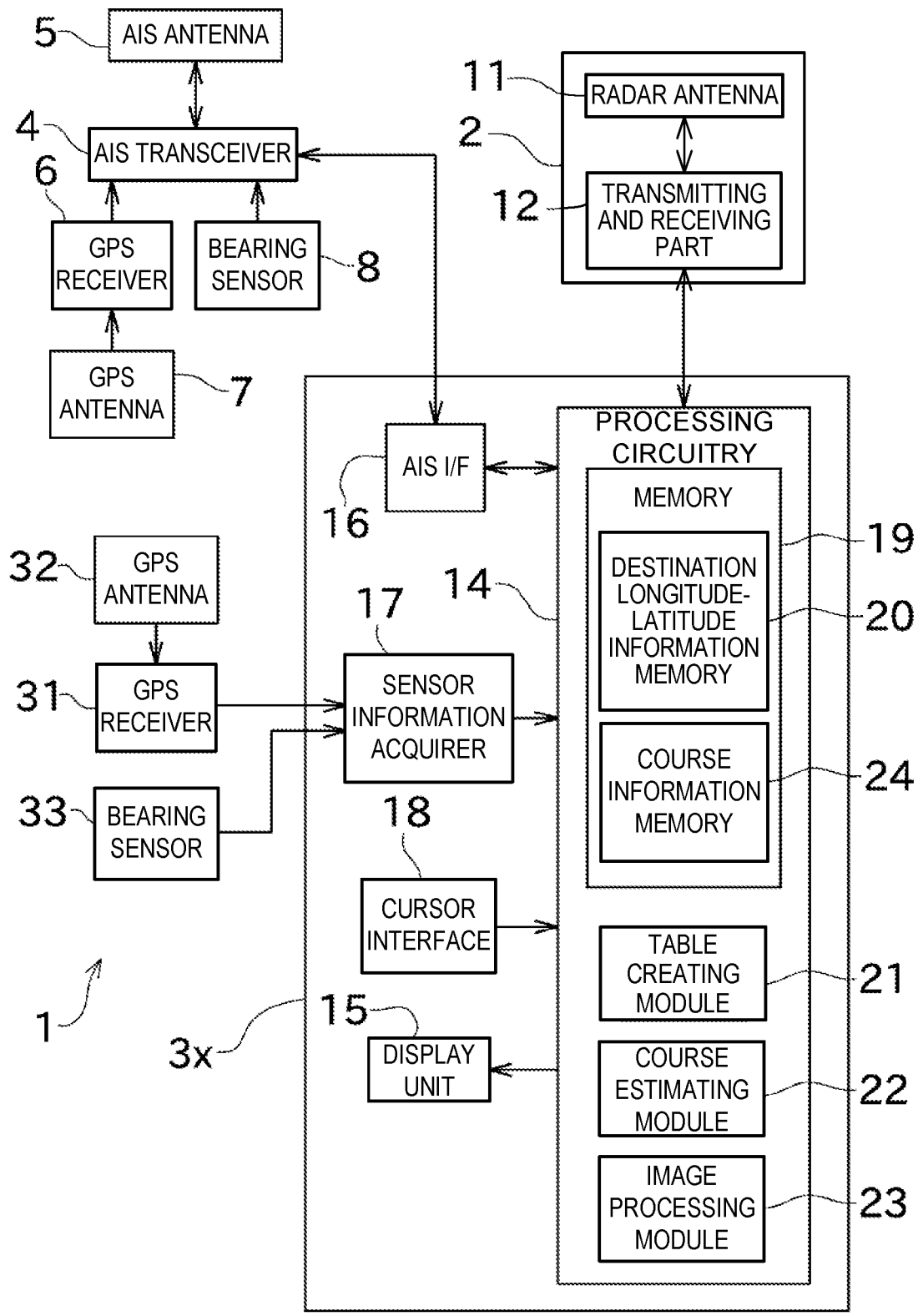
FIG. 8 is a functional block diagram illustrating an overall configuration of a radar apparatus including a radar indicator according to a second embodiment.
Figure 9:
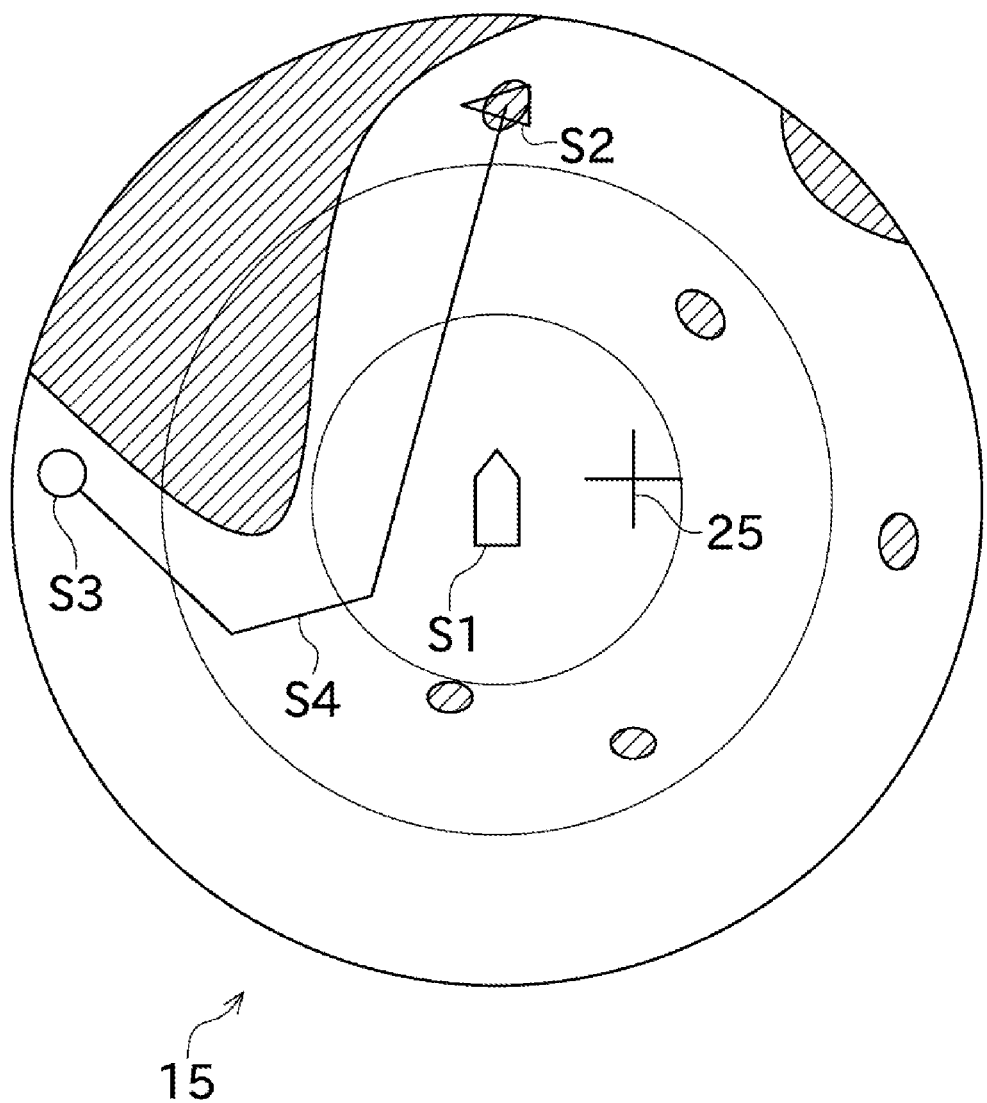
FIG. 9 is a view illustrating an example of a display screen of a display unit of the second embodiment.

Next a second embodiment is described. FIG. 8 is a functional block diagram illustrating an overall configuration of a radar apparatus 1 according to the second embodiment. FIG. 9 is a view illustrating an example of a display screen of a display unit 15 according to the second embodiment. Note that, also in the description of this embodiment, the components same as/similar to the ones in the embodiment described above are denoted with the same reference characters as those in the embodiment described above in the drawings, and the description thereof may be omitted.

In a radar indicator 3x of the second embodiment illustrated in FIG. 8, processing circuitry 14 may include a course information memory 24. This course information memory 24 may store in advance information of course(s) determined by a law etc. that ships should pass or course(s) available for ships to pass.

A course estimating module 22 may acquire a longitude and latitude of a current position, and a longitude and latitude of a destination for every one of other ships (every other-ship number), from an other-ship information table 21a inputted from a table creating module 21. Then, for every one of the other ships, the course estimating module 22 may obtain by calculation a route which is optimal in reaching from the current position to the destination and passes the course stored in the course information memory 24 as much as possible. Although it is not described in detail, a known method of searching an optimal route may be used for this calculation. Moreover the course estimating module 22 may output the route obtained by the calculation, to the image processing module 23 as an estimated course S4.

FIG. 9 illustrates the display example of the display unit 15 in the second embodiment. In the example of FIG. 9, echoes indicating a land bulges to a position between the other ship and the destination of the other ship. In this case, if the other-ship symbol S2 is simply connected to the other-ship destination symbol S3 to be the estimated course as the first embodiment described above, the estimated course passes the land, which becomes greatly different from an actual course, and thus, it is not preferable.

In this regard, in this embodiment, if the course information memory 24 stores a course suitably going around the land, the course estimating module 22 may perform an estimation by using the course, so as to obtain and display a suitable estimated course S4 as illustrated in FIG. 9. Therefore, a more accurate course of the other ship may be estimated and displayed.

Note that, a case may also be considered that due to a water depth, regulations etc., the size of ships navigable on the course(s) registered in the course information memory 24 is limited. In consideration of this, the course information memory 24 of the second embodiment may be configured to store each ship course along with the information of the size of ships navigable on the course. In this case, when the course estimating module 22 calculates the optimal route (estimates the course), it may estimate one of the courses stored in the course information memory 24 which travels around unnavigable shallow water or land and reaches the destination with a shortest distance, based on the size (body length and width) of the other ship obtained from the AIS information. Therefore, an even more accurate course of the other ship by taking into consideration the size of the ship may be estimated and displayed.

Although the suitable embodiments of this disclosure are described above, the above configurations may be modified as follows, for example.

The memory 19, instead of being provided to the processing circuitry 14, may be an external memory medium, such as a flash memory or a CD-ROM configured to allow the radar indicator 3 to read the stored contents therein. That is, the memory 19 (destination longitude-latitude information memory 20 and course information memory 24) may not be provided to the radar indicator 3.

The specific mode of displaying the destination and estimated course of the other ship on the display unit 15 may arbitrarily be changed as long as they are graphically displayed. For example, instead of the circle, a symbol, such as a rectangle, may be displayed as the destination of the other ship, or a small drawing (icon) imitating an initial character indicating the destination (e.g., "D" which is the initial character of "Destination") may be displayed as the destination of the other ship. Further the estimated course may be displayed as, for example, a dashed line, instead of the solid line.

In the embodiments described above, the symbols and lines displayed on the display unit 15 are displayed in the same color; however, without limiting to this, they may be displayed by differentiating the color for each ship, for example.

In the embodiments described above, even when the destination of the other ship is located outside the range of the radar image, in order for the user to easily grasp the destination of the other ship, the other-ship destination symbol S3 may be displayed in the end part of the radar image (see FIG. 4 etc.) so as to correspond to the direction of the destination seen from the other ship; however, without limiting to this, a configuration may be adopted such that in the above case, the other-ship destination symbol S3 is not displayed. Moreover the display mode of the other-ship destination symbol S3 (e.g., the geometric shape, color etc. of the symbol) may be different between cases where the other ship is within the displayed range and outside the displayed range.

A configuration may be adopted such that the other-ship information table 21a contains information of the geographical name of each destination corresponding to the destination code, respectively, so that the corresponding geographical name is displayed simultaneously to each other-ship destination symbol S3. The geographical name may be displayed near the other-ship destination symbol S3 or in the popup window 26, for example.

In the embodiments described above, the cursor 25 may have a shape of a cross; however, without limiting to this, the cursor 25 may have a shape of an arrow, for example.

The operation of specifying the other-ship symbol S2 with the cursor 25 is not limited to be the operation of superimposing the cursor 25 on the other-ship symbol S2. For example, the other-ship symbol S2 may be specified by performing a suitable key operation while the cursor 25 is placed on the other-ship symbol S2.

In the example described with reference to FIG. 6, by superimposing the cursor 25 on the other-ship symbol S2, the other-ship destination symbol S3 and the estimated course S4 of the other ship may be displayed; however, without limiting to this, a configuration may be adopted such that the other-ship destination symbol S3 is displayed in addition to the other-ship symbol S2 in the normal state of FIG. 6, and by superimposing the cursor 25 on the other-ship destination symbol S3, the estimated course S4 may be displayed.

In the embodiments described above, each of the AIS transceiver 4 and the sensor information acquirer 17 may be configured to include the GPS receiver, the GPS antenna, and the bearing sensor; however, without limiting to this, a configuration may be adopted such that the AIS transceiver 4 and the sensor information acquirer 17 share a single GPS receiver, a single GPS antenna, and a single bearing sensor.

In the embodiments described above, the AIS transceiver 4 may perform both transmission and reception of the AIS information; however, a configuration may be adopted such that the function of receiving the AIS information is provided solely and the transmission is not performed.

This disclosure is not limited to the radar indicators 3 and 3x as described in the above embodiments etc., and may be applied to a plotter device configured to display a chart image indicating a situation in the vicinity of the one ship, and the position of the other ship acquired from the AIS information such that the position of the other ship is superimposed on the chart image.

DESCRIPTION OF REFERENCE CHARACTERS

3 Radar Indicator (Ship Vicinity Information Display Device)
14 Processing circuitry
15 Display Unit
16 AIS Interface (Receiver)
20 Destination Longitude-latitude Information Memory (Destination Position Memory)
20a Destination Longitude-Latitude Information
22 Course Estimating Module
S3 Other-Ship Destination Symbol (Geometric Shape)
S4 Estimated Course

The invention claimed is:

1. A ship vicinity information display device, comprising:
a sensor information acquirer configured to acquire a position of a ship;
a receiver configured to receive information of a destination position of another ship, a position of the other ship, and a heading of the other ship, wherein the information is included in Automatic Identification System (AIS) information transmitted by the other ship; and
processing circuitry configured to display on a display unit, by superimposing based on the position of the ship:
a radar image based on radar echoes obtained from a radar antenna,
a destination symbol indicating at least one of the destination position of the other ship and a direction to the destination position of the other ship from the other ship, and
an other-ship current symbol indicating the heading and position of the other ship.

2. The ship vicinity information display device of claim 1, wherein the destination information of the other ship includes a name of the destination position, and
wherein the processing circuitry acquires a longitude and latitude of the destination position of the other ship by using information stored in a destination position memory configured to store the destination information indicating the destination position and the name of the destination position in association with each other.

3. The ship vicinity information display device of claim 2, wherein the destination information of the other ship is a destination code indicating a code of the destination position, and
wherein the destination position memory stores the destination code and the destination position in association with each other.

4. The ship vicinity information display device of claim 3, wherein
the other ship is one of a plurality of other ships, and
the processing circuitry displays, for each of the plurality of other ships simultaneously, at least one of:
the destination position of the other ship; and
the direction to the destination position from the other ship.

5. The ship vicinity information display device of claim 4, wherein a target other ship for which the destination information is displayed is selectable from the plurality of other ships displayed on the display unit.

6. The ship vicinity information display device of claim 1, wherein
the other ship is one of a plurality of other ships, and
the processing circuitry displays, for each of the plurality of other ships simultaneously, at least one of:
the destination position of the other ship, and
the direction to the destination position from the other ship.

7. The ship vicinity information display device of claim 6, wherein a target other ship for which the destination information is displayed is selectable from the plurality of other ships displayed on the display unit.

8. The ship vicinity information display device of claim 1, wherein the processing circuitry displays a geometric shape on the display unit, and
   wherein a position of the geometric shape displayed on the display unit indicates the destination position of the other ship.

9. The ship vicinity information display device of claim 1, wherein the processing circuitry includes a course estimating module configured to create an estimated course that is a scheduled course of the other ship estimated based on the destination position of the other ship, and
   wherein the processing circuitry displays the estimated course created by the course estimating module on the display unit.

10. The ship vicinity information display device of claim 9, wherein the estimated course is a straight line coupling a current position of the other ship to the destination position of the other ship.

11. The ship vicinity information display device of claim 9, wherein the course estimating module estimates a course from the current position of the other ship to the destination position of the other ship by using course information stored in a course information memory, wherein the course information is information of courses available for a ship.

12. The ship vicinity information display device of claim 11, wherein the course information memory stores information of courses and sizes of ships that are navigable on the courses, respectively, and
   wherein the course estimating module selects one of the courses that is available for the other ship based on a size of the other ship received from the other ship by the receiver, and estimates the course from the current position of the other ship to the destination position of the other ship by using the selected course.

13. The ship vicinity information display device of claim 1, comprising a cursor interface configured to control a cursor displayed on the display unit so as to specify an arbitrary position on a display screen of the display unit,
   wherein when the position of the other ship displayed on the display unit is specified by the cursor, for at least one of the specified other ship and a different other ship, a display mode of at least one of the destination position and the direction to the destination position from the other ship is changed.

14. The ship vicinity information display device of claim 1, wherein the receiver receives the AIS information transmitted by the other ship, and
   wherein the destination information is included in the AIS information.

15. A method of displaying information of the vicinity of one ship, comprising:
   acquiring a position of a ship;
   receiving information of a destination position of another ship, a position of the other ship, and a heading of the other ship, wherein the information is included in Automatic Identification System (AIS) information transmitted by the other ship; and
   acquiring a longitude and latitude of the destination based on the destination information of the other ship and graphically displaying, by superimposing based on the position of the ship:
   a radar image based on radar echoes obtained from a radar antenna,
   a destination symbol indicating at least one of the destination position of the other ship and a direction to the destination position of the other ship from the other ship, and
   an other-ship current symbol indicating the heading and position of the other ship.

* * * * *